United States Patent
Sieth et al.

(10) Patent No.: US 11,025,498 B2
(45) Date of Patent: Jun. 1, 2021

(54) DEVICE MODEL TO THING MODEL MAPPING

(71) Applicant: SAP SE, Walldorf (DE)

(72) Inventors: Thilo Sieth, Bad Rappenau (DE); Christian Holzwarth, Sinsheim (DE)

(73) Assignee: SAP SE, Walldorf (DE)

( * ) Notice: Subject to any disclaimer, the term of this patent is extended or adjusted under 35 U.S.C. 154(b) by 284 days.

(21) Appl. No.: 15/684,488

(22) Filed: Aug. 23, 2017

(65) Prior Publication Data
US 2019/0068454 A1   Feb. 28, 2019

(51) Int. Cl.
| | | |
|---|---|---|
| *H04L 12/24* | (2006.01) | |
| *H04L 29/08* | (2006.01) | |
| *H04W 4/70* | (2018.01) | |
| *H04W 4/38* | (2018.01) | |
| *B25J 9/16* | (2006.01) | |

(52) U.S. Cl.
CPC ............ *H04L 41/145* (2013.01); *H04L 67/12* (2013.01); *H04W 4/38* (2018.02); *H04W 4/70* (2018.02); *B25J 9/1664* (2013.01); *B25J 9/1682* (2013.01); *B25J 9/1694* (2013.01)

(58) Field of Classification Search
CPC ........ H04L 41/145; H04L 67/12; H04W 4/70; H04W 4/38
See application file for complete search history.

(56) References Cited

U.S. PATENT DOCUMENTS

| | | | |
|---|---|---|---|
| 9,613,505 B2* | 4/2017 | Martinson | G08B 6/00 |
| 9,827,683 B1* | 11/2017 | Hance | B25J 19/023 |
| 2009/0312985 A1* | 12/2009 | Eliazar | G06N 20/00 |
| | | | 702/187 |
| 2010/0179689 A1* | 7/2010 | Lin | G05B 19/41865 |
| | | | 700/250 |
| 2013/0125028 A1* | 5/2013 | Pearson | G09B 9/00 |
| | | | 715/757 |
| 2016/0267755 A1* | 9/2016 | Martinson | G08B 6/00 |
| 2016/0274553 A1* | 9/2016 | Strohmenger | G05B 17/02 |
| 2016/0359664 A1* | 12/2016 | Malegaonkar | G06F 8/34 |
| 2017/0203438 A1* | 7/2017 | Guerin | B25J 9/1605 |
| 2017/0295071 A1* | 10/2017 | Yang | H04L 41/145 |
| 2017/0295253 A1* | 10/2017 | Siegel | H04L 41/145 |
| 2017/0297200 A1* | 10/2017 | Stubbs | G05B 19/418 |
| 2018/0019929 A1* | 1/2018 | Chen | H04L 41/145 |
| 2019/0283248 A1* | 9/2019 | Guerin | B25J 9/1671 |

\* cited by examiner

*Primary Examiner* — Philip J Chea
*Assistant Examiner* — Ruth Solomon
(74) *Attorney, Agent, or Firm* — Buckley, Maschoff & Talwalkar LLC (57) ABSTRACT

A system, method, and computer-readable medium, to define and represent real world physical devices and physical things and corresponding virtual representations thereof and to define relationships between the virtual representations of the physical devices and physical things. The defined relationships can be saved to a memory, retrieved from the memory, and used by one or more applications.

20 Claims, 7 Drawing Sheets

```
OBTAIN A DEVICE MODEL VIRTUAL REPRESENTATION OF
A PHYSICAL DEVICE, THE DEVICE MODEL TO SUPPLY DATA
RELATED TO A PHYSICAL THING AND HAVING AT LEAST
ONE SENSOR OF AT LEAST ONE CAPABILITY
                                                 305
```

```
ASSIGN AT LEAST ONE CAPABILITY OF THE AT LEAST
ONE SENSOR OF THE DEVICE MODEL TO A THING MODEL
VIRTUAL REPRESENTATION OF A PHYSICAL THING, THE
PHYSICAL THING BEING A REAL WORLD ENTITY HAVING AT
LEAST ONE ASSOCIATED PROPERTY
                                                 310
```

```
SAVE A RECORD OF THE ASSIGNMENT OF THE AT LEAST ONE
CAPABILITY OF THE AT LEAST ONE SENSOR OF THE DEVICE
MODEL TO THE THING MODEL IN A MEMORY
                                                 315
```

```
RECEIVE AN INDICATION OF A THING TYPE, THE THING TYPE
BEING A DATA STRUCTURE OF A CATEGORY OF THINGS
REPRESENTING PHYSICAL ENTITIES AND HAVING AT
LEAST ONE ASSOCIATED PROPERTY
                                                    405
```

```
RECEIVE AN INDICATION OF A DEVICE TYPE, THE DEVICE
TYPE BEING A DATA STRUCTURE OF A CATEGORY OF
DEVICES REPRESENTING ONE OR MORE TECHNICAL
CAPABILITIES OF PHYSICAL DEVICES
                                                    410
```

```
ASSIGN THE AT LEAST ONE ASSOCIATED PROPERTY OF
THE THING TYPE TO AT LEAST ONE OF THE CAPABILITIES
OF THE DEVICE TYPE
                                                    415
```

```
SAVE A RECORD OF THE ASSIGNMENT OF THE AT LEAST
ONE ASSOCIATED PROPERTY OF THE THING TYPE TO AT LEAST
ONE OF THE CAPABILITIES OF THE DEVICE TYPE IN A MEMORY
                                                    420
```

RECEIVE A SET OF DATA, THE DATA RELATING TO A PHYSICAL THING HAVING AT LEAST ONE ASSOCIATED THING PROPERTY
505

DETERMINE, FROM THE RECEIVED SET OF DATA, IDENTIFYING INFORMATION INDICATIVE OF A DEVICE TYPE SOURCING THE SET OF DATA, THE DEVICE TYPE HAVING AT LEAST ONE ASSOCIATED DEVICE PROPERTY
510

ASSIGNING, BASED ON DEVICE TYPE TO THING TYPE ASSIGNMENT CONSTRAINTS, AT LEAST ONE DEVICE PROPERTY OF THE DEVICE TYPE TO AT LEAST ONE THING PROPERTY OF THE THING TYPE
515

SAVE A RECORD OF THE ASSIGNMENT IN A MEMORY
520

DEVICE MODEL TO THING MODEL MAPPING

BACKGROUND

The Internet of Things (IoT) can be used to describe many aspects of the real world. Given the vastness and possibilities of real world entities (i.e., "things") that might be include in an IoT context, describing the many different things can be a time consuming process. Each and every machine, system, and device in a representative IoT environment may have to be defined in order to be effectively represented in a corresponding digital world. Moreover, operating characteristics and measurables related to the things may be used in an effort to accurately model and represent the real world things in the digital world.

As such, there exists a need to relate real world things and their associated measurements in an efficient and integrated manner to create accurate and reliable representations and models of things in an IoT context.

DETAILED DESCRIPTION

The following description is provided to enable any person in the art to make and use the described embodiments. Various modifications, however, will remain readily apparent to those in the art.

In some example contexts, use cases, and embodiments, one or more terms will be used in the present disclosure. As a matter of introduction and to ease the understanding of the present disclosure, a number of terms may be introduced, where the full meaning of the following terms will be further understood in context of the disclosure herein, on the whole.

Figure 1:
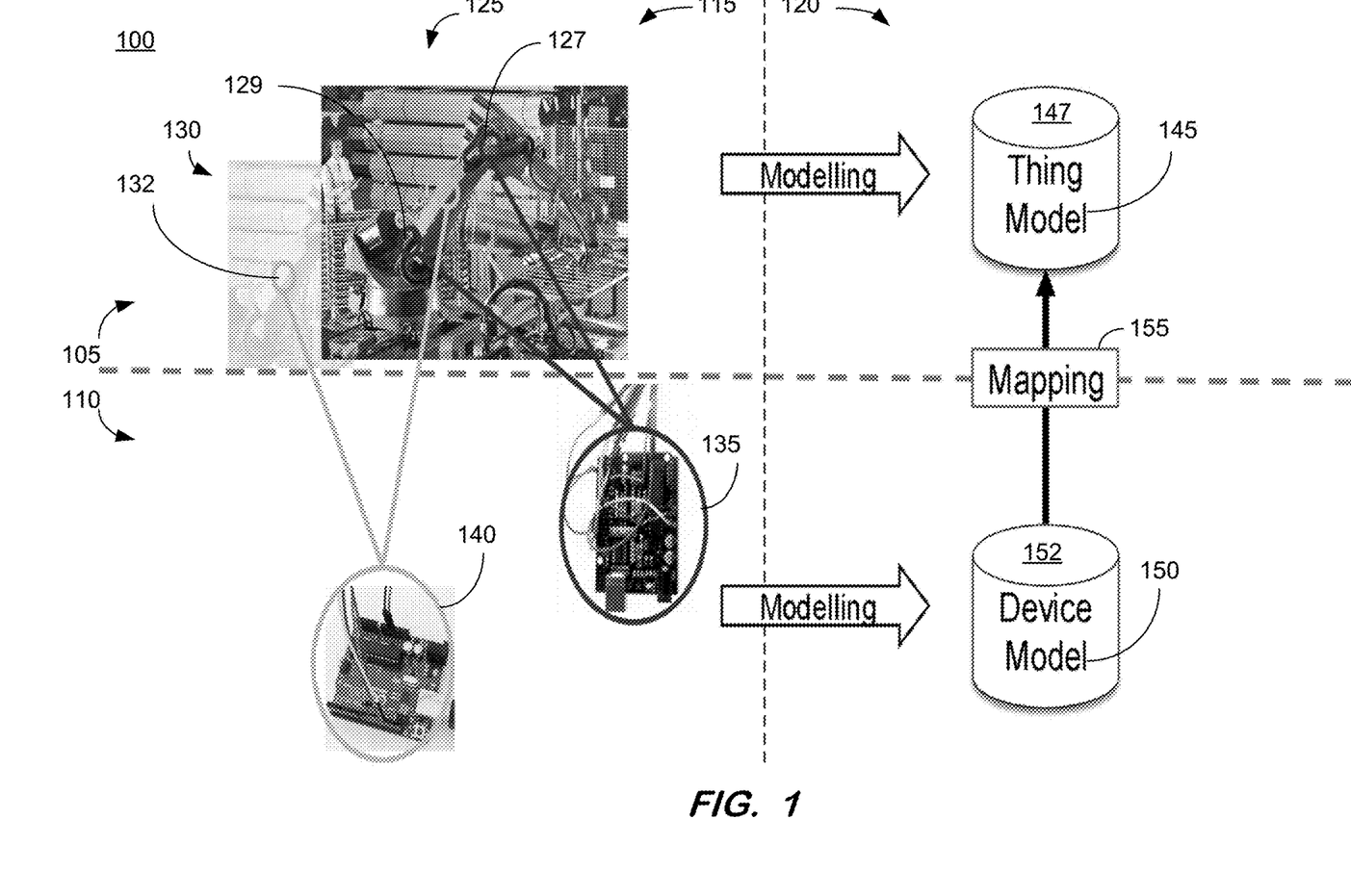
FIG. 1 is an illustrative diagram of an example logical framework herein.

FIG. 1 is an illustrative diagram of a two level logical approach or framework 100 related to things in the context or environment of the Internet of Things (IoT). In general, framework 100 may be divided into a "thing" level 105 including one or more physical things 125, 130 and a "device" level 110 that includes one or more physical devices 135, 140 that may be related to the physical things on thing level 105. Additionally, the environment in FIG. 1 may generally be divided into the real world 115 realm and the virtual world of models 120 where entities (e.g., physical things 125, 130 and physical devices 135, 140) are represented by mathematically based models and data structures as a virtual thing or thing model 145 and virtual device or device model 150. In some aspects herein, a virtual thing may be referred to as a thing model and a virtual device may be referred to as a device model.

In some aspects herein, a physical thing can be any real-world entity. In some aspects and examples of the present disclosure, a physical thing will refer to an entity of interest to a user, an application, and/or organization, including a machine, a system, mechanism, and components thereof. The thing models (i.e., virtual things) created and processed herein may be implemented by a data structure. The data structure may be stored in a persistent memory, where it can be accessed for a future use, including the modification thereof to represent new and different things.

In some aspects herein, a physical device can be any real-world entity. In some aspects and examples of the present disclosure, a physical device will refer to an entity of interest to a user and/or organization, including a sensor, machine, a smart device, a system, a subsystem of a device/machine, and components thereof that may act as a source of data (i.e., a data source) including information related or pertaining to a physical thing. In some embodiments, a physical device herein may include or function, at least in part, to produce, obtain, and otherwise provide data related to a technical aspect of a physical thing. A physical device's ability or functionality to provide data related to a technical aspect of a physical thing might be categorized into one or more capabilities of the device. The virtual devices or device models created and processed herein may be implemented by a data structure. The data structure may be stored in a persistent memory, where it can be accessed for a future use, including the modification thereof to represent new and different device. In some embodiments, the functionalities, systems, applications, and tools that may be implemented in accordance with the present disclosure of virtual things (i.e., thing models) and virtual devices (i.e., device models) may be agnostic with respect to one or more operating systems, communication protocols, programming languages, and data configuration, storage, and processing technologies.

Referring to FIG. 1, physical thing 125, a manufacturing assembly line robot, has two axis points, axis 1 at 127 and axis 2 at 129. Each of axis 1 and axis 2 can be defined or characterized by one or more properties. In the example of FIG. 1, each axis 127 and 129 is defined by a pressure (P) property, a torque (T) property, and a speed (S) property, although some embodiments may be defined by a fewer number, a greater number, and alternative properties. Physical devices 135, 140 include technical sensors, systems, and components to measure, represent, or otherwise indicate technical aspects of real world things. In some embodiments, physical devices 135, 140 can include one or more sensors or other measuring/observation means or mechanisms. In general, physical devices herein may measure or otherwise provide or supply data including one or more of measurements, observations, and other information related to a physical thing entity. In the example of FIG. 1, device 135 includes a device configured to report or supply (real time and/or historical time stamped) measurements of the pressure, torque, and speed of axis 1 (127) and axis 2 (129) of thing 125. In some embodiments, physical device 135 may be integral to physical thing 125, having been configured to interface with physical thing 125 at the time of manufacture by the manufacturer of the robot. In some embodiments, physical device 135 may be interfaced with physical thing 125 as an aftermarket upgrade, modification, or enhancement, either by the original manufacturer or a third-party.

In the example of FIG. 1, physical device 140 is configured to report or supply (real time and/or historical time stamped) measurements of the vibrations associated with physical thing 125 and 130 (shown in phantom to indicate a physical device herein may supply data related to more than one particular physical thing). Physical device 140 may be original to the two physical robots 125, 130 or it may be an aftermarket enhancement.

Physical things (e.g., robots 125, 130) in the real world 115 are modeled (i.e., represented by a mathematically based data structure) as virtual things such as thing models 145 in the modeled world 120. The modelling of physical things to obtain the virtual things or thing models 145 may be accomplished using a combination of different techniques and processes. In some embodiments, thing model 145 may accurately and reliably represent (i.e., model) the real world or physical thing (e.g., robot 125) such that thing model 145 may be referred to as a "digital twin" of the robot since thing model 145 may accurately respond to inputs in a manner the same as or most similar to the actual physical robot. In some aspects, a basis for defining characteristics (i.e., properties) of the thing model may be guided by an application that will interact or interface with the thing model. That is, an application (e.g., a processor-executable business application that analyzes and generates reports including analytical data regarding aspects of a manufacturing process) may use certain data (e.g., torque of a robot axis 1) and the data needed by the application may be considered in the modelling of the physical things. In this manner, the modelling of physical things herein might be efficiently tailored to one or more specific applications. In some embodiments, thing models 145 may be stored in an instance of a persistent memory or database 147.

Physical devices (e.g., sensors 135, 140) in the real world 115 are modeled (i.e., represented by a mathematically based data structure) as device model 150 in the modeled world 120. The modelling (defining) of physical devices to obtain the device model might be performed using different techniques and processes. In some aspects, a basis for defining characteristics (i.e., capabilities) of the device model may be driven by an underlying technology of the physical device. In some embodiments, device models 150 may be stored in an instance of a persistent memory or database 152.

Mapping mechanism 155 (e.g., a process implemented by a system, service, platform, or processor-executable instructions) may receive indications of properties of physical things from thing model(s) 145 stored in memory 147 and indications of measurements from device model(s) 150 stored in memory 152 and relates (i.e., bridges) measurements sourced from the physical devices to the appropriate aspects (properties) of the related physical things as represented by a thing model. In FIG. 1, mapping mechanism 155 may operate to relate measurements from physical devices 135, 140 as represented by device model 150 to the appropriate properties of physical things 125, 130 as represented by thing model 145. For example, a torque measurement as obtained and reported from physical device 135 can be mapped to a particular physical thing, axis 1 of robot 125, so that a data consumer (e.g., an executing application or service) may use data and information that accurately and fully represents the characteristics and performance of the physical things 125, 130.

In some aspects, mapping mechanism 155 logically enables mapping between two abstraction layers, a virtual device abstraction layer (i.e., as represented by a device model) and a virtual thing abstraction layer (i.e., as represented by a thing model).

In some aspects, the framework of FIG. 1 enables, supports, or facilitates scenarios and use cases where a physical device serving data for a specific physical thing may be exchanged with another physical device without loss of accuracy or reliability (e.g., due to a separation between devices and things herein, including the modelling of same), and more than one physical device might source data for a particular property of a physical thing.

Figure 2:
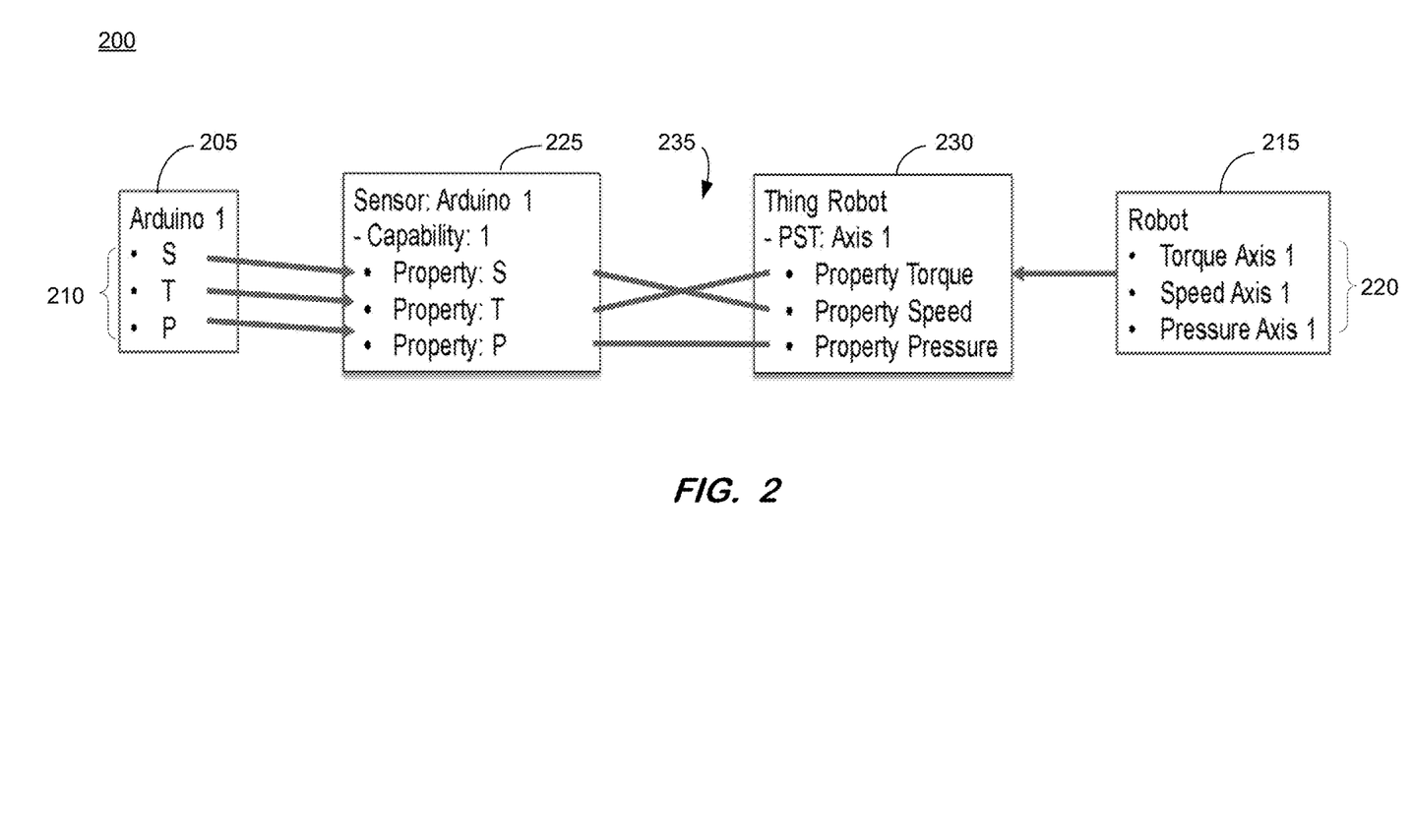
FIG. 2 is an illustrative block diagram of a device model, a thing model, and a relationship therebetween.

FIG. 2 is an illustrative depiction of a physical device to physical thing integration system 200 and process, in accordance with some embodiments herein. System 200 illustrates different independent components, including real world (i.e., physical) devices 205 and physical things 215, that might be related or bound to each other via mappings 235. Physical device 205 includes a system having a plurality of capabilities 210 to report data from a thing of interest. In the example of FIG. 2, physical device 205 may be implemented by an Arduino based controller having a capability to report a set of properties of a physical thing, although other implementations may be possible. Physical device 205 has a capability to report data indicative of a speed(S), a torque(T), and a pressure(P). The capabilities of physical device 205 are modeled and represented as virtual device or device model 225. As shown, device model 225 includes a capability 1 that includes a set of properties S, T, and P.

FIG. 2 further includes a physical thing 215, which is a robot in the present example. The robot has a number of associated properties, including the set of properties 220. The set of properties 220 includes a speed(S), a torque(T), and a pressure(P). The properties of the real world (i.e., physical world) robot 215 are modeled and represented as virtual thing or thing model 230. As shown, thing model 230 includes a set of properties S, T, and P.

Mapping mechanism 235 might, in some embodiments, be configured or defined by a user, administrator, "thing engineer", or other entity (e.g., person or automated processor, system, or service) to map or otherwise assign device capabilities (e.g., the capability of physical device 205 to accurately obtain and report S, T, P measurements as represented by device model 225) to properties (e.g., 220) of physical thing 215, as accurately represented by thing model 230. For example, the speed of physical Arduino 1 in FIG. 2 is represented as capability 1, speed 1 in device model 225. Separately and independent thereof, the speed of axis 1 of the physical thing 215 is represented in thing model 230. The configurer of mapping mechanism 235 defines or otherwise specifies a controlling relationship of the device model's 225 speed to the modeled speed property of the thing model 230. The definition of the mapping may be stored for a future use in, for example, a persistent memory or database instance.

In some aspects, a mapping operation disclosed herein may be defined and configured during a design time (DT) of a process (including a storage of the mapping), whereas the use of the defined mapping, including the actual associating and assignment of a device model's capability measurements/data to appropriate (as defined by the established, defined mappings) properties of a related thing model is executed during a run time (RT) of a process. In some aspects, the set-up or defining of the mapping process occurs during DT and the ingestion of the mapping is accomplished during RT. The defined mapping(s) may be used to associate device model measurements to appropriate thing models during the RT.

In some aspects, some processes herein involve two levels of communication connectivity. Those levels of connectivity may include (1) reading data from a physical device, including taking the protocol(s) and signature(s) of various devices into account and (2) mapping device model data to a thing model time-series data.

In some embodiments, aspects of the present disclosure can be viewed as occurring on three levels. One level may be "type" level for onboarding of virtual things and virtual devices on a type level. On this level of abstraction, virtual thing types and virtual device types are defined for use in systems and processes herein, where a "type" refers to a group or set of things (devices) having at least some of the same or similar properties (capabilities). Another level of abstraction is instance-level onboarding that includes defining specific instances of a virtual thing and a virtual device for use in systems and processes herein. A particular virtual thing or virtual device is defined as including the particular properties or capabilities for the specific virtual things or virtual devices, respectively. A third level of abstraction includes data ingestion, which occurs at or during a runtime (RT), wherein data of a device model is used by being mapped to a property of a thing model. In some aspects, onboarding operations may be triggered by a thing modeler or a device modeler for type level onboarding and/or instance level onboarding.

In some embodiments herein, onboarding of virtual devices and virtual things, whether on a type level or an instance level, is not limited to pertaining to static or fixed virtual devices and virtual things. This flexibility in some embodiments herein might reflect real world changes that may occur in or to real world things and devices. As such, for example, properties of virtual things and measuring points for virtual devices may be added, removed, or modified in some use cases herein to reflect real world changes. As another example, a physical device might be exchanged (e.g., an electric utility meter) for another physical device having the same or similar capabilities in some use cases herein without impact to a related virtual thing or the relevant mapping between a virtual model of the thing of interest and a virtual device model of the exchanged device.

In some embodiments, mappings herein may be created on a meta level with sufficient details to cover different instances, thereby providing an option for fully automated onboardings. For example, if a mapping is defined on a type level to encompass various different types of virtual devices (things), then the mapping might operate as a mapping blueprint for multiple different instances of virtual devices (things), where a mapping for each instance of the virtual devices (things) need not be individually generated.

In some embodiments, a process or method herein might include, support, or extend end-to-end error handling over an entire ingestion queue such that all phases of measurement data and information processing related thereto might be monitored or tracked, from intake or measurement of data by a specific physical device, the process to format the measurement data, the device model used to represent the real world device, the mapping settings used in mapping the device model measurement data to a related thing model, and other aspects.

In some aspects, the features and concepts disclosed herein may be applied and exemplified in three core use cases. The three core use cases may also include a number of variations, thereby greatly expanding the possible use cases for the methods and systems disclosed herein. The three core use cases may include (1) onboarding of devices for things of interest; (2) the creating of mapping relationships, including defining the proper assignments of thing properties to device capabilities for virtual things (i.e., thing models) and virtual devices (i.e., device models); and (3) data ingestion, which occurs at RT, wherein data of a device model is used by being mapped to a property of a thing model and might be fully automated.

Figure 3:
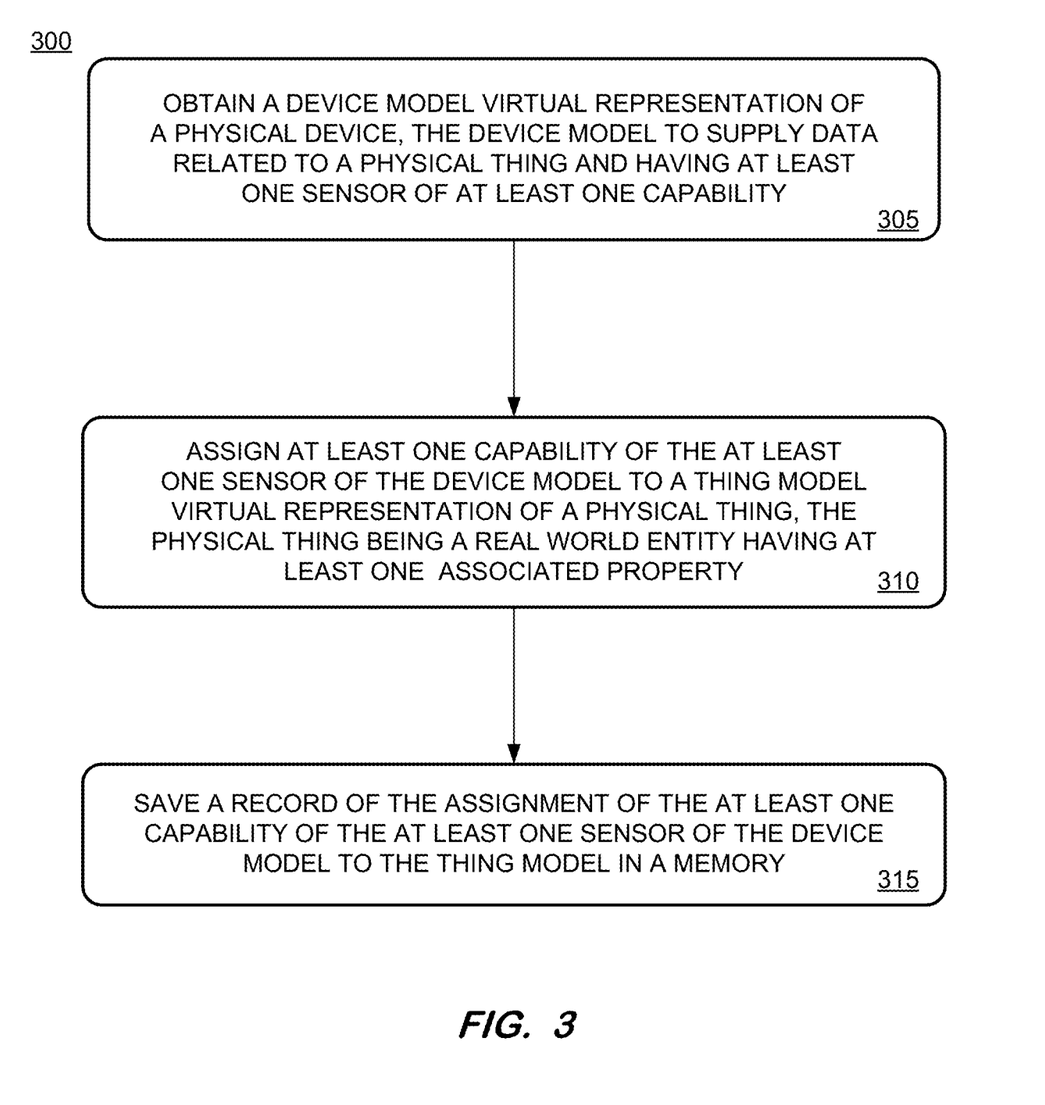
FIG. 3 is an example flow diagram of a process herein.

FIG. 3 relates to a process 300 to onboard a device, in accordance with an example embodiment herein. Process 300 might be invoked in response to a physical thing engineer's desire to find, in an efficient manner, a data source related to a thing of interest. In some scenarios, the thing engineer may have access to many different device models, including different sensors, capabilities, and functionalities. In some scenarios, process 300 may be invoked in response to the creation of a new thing or a virtual model representation thereof. At operation 305, a device model or virtual representation of a physical device is obtained. The device model may generally refer to an entity (sensor, recorder, meter, component, system, etc.) to supply data related to a real world/physical thing and have a sensor of at least one data reporting capability. In some scenarios, the device model representation or device model may be obtained from an existing set of one or more device models that accurately mimics characteristics of a real world (i.e., physical) device. In some scenarios, an IoT Service may provide access to data including the data model obtained in operation 305. The virtual device representation in operation 305 is selected for having the at least one capability desired for the current use case (e.g., compatibility with the thing of interest).

At operation 310, at least one capability of the at least one sensor of the device model obtained at operation 305 is assigned to a thing model representation of the physical thing of interest. In particular, the at least one capability of the at least one sensor of the device model of operation 305 is assigned to at least one property associated with the thing model of the physical thing of interest. In some embodiments, the sensor assigned to the thing model's property in operation 310 is a previously unassigned sensor of the device model.

Operation 315 includes saving a record of the assignment of the at least one capability of the at least one sensor of the device model to thing model's property to a memory. In some instances, the memory is a persistent memory. In some embodiments, the memory is a main memory of an instance of an in-memory database.

According to process 300, an instance level device to thing mapping might be created. In some embodiments, a type level mapping may be created by further saving a corresponding device type (DT) to thing type (TT) assignment where the device type encompasses the device represented by the device model obtained at operation 305 and the thing type encompasses the thing represented by the thing model/representation of operation 310. If no corresponding TT-to-DT mapping exists, then it might be created in accordance with other aspects herein.

Regarding process 300, the onboarding process disclosed therein may be applied to scenarios of thing type (TT) onboarding and device level onboarding. For TT onboarding use cases, a TT may be created in, for example, a thing modeler and a device type (DT) related to the given TT may be obtained from a repository or other source. Furthermore, DT and TT definitions in a mapping mechanism may be used to create mapping associations between the properties of the given TT on the thing side and the measurements of the DT on the device side. The thus obtained TT to DT mapping can be saved for automatic onboarding of different and varied things, as opposed to creating a mapping for individual things for each instance of a thing of a same type.

For device level onboarding corresponding to process 300, a thing might be created based on a given TT in a thing modeler. A device type (DT) related to the given thing (instance) may be obtained from a repository or other sources. A mapping for the TT to DT combination can be retrieved or created (if not existing). The instance of the thing of interest can be mapped to a device based on the retrieved or newly created TT to DT mapping. The thing to device instance level mapping can be saved to a memory.

Figure 4:
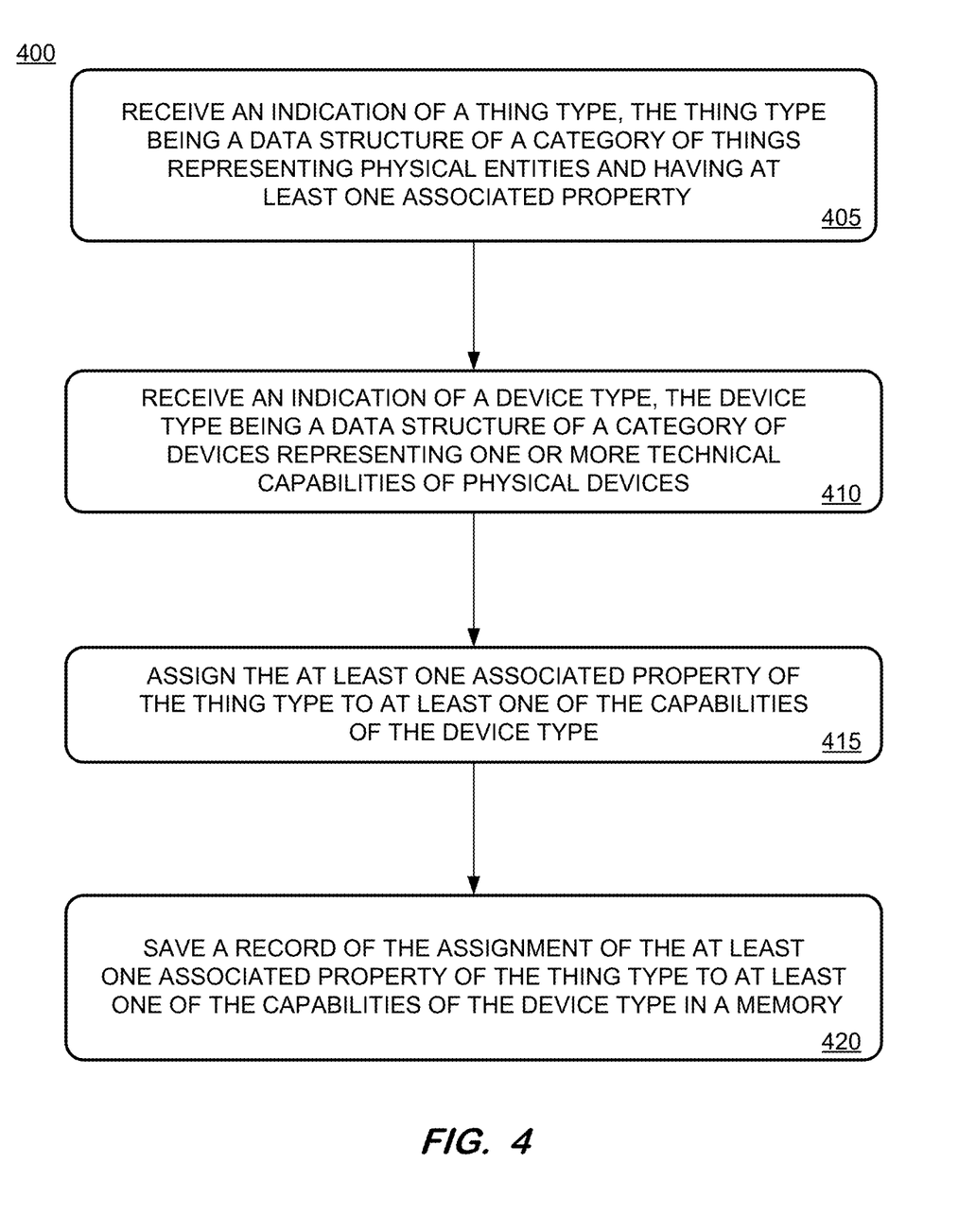
FIG. 4 is an example flow diagram of another process herein.

FIG. 4 relates to a process 400 to create a mapping on a type level, in accordance with an example embodiment herein. Process 400 might be invoked in response to a thing engineer's desire to save mapping information on a type level in an effort to avoid having to supply mapping information on an instance level at an onboarding time. In general, process 400 outlines a process to generate a relationship or assignment between a thing type (TT) to a device type (DT). In some scenarios, the thing engineer (or other entity) may have access to one or more named property set types (nPST) for a given TT. At operation 405, an indication of a thing type (TT) is received. The TT is a data structure of a category or set of things representing real world entities, where the real world or physical things have at least one associated property. The at least one associated property for the TT may be part of a nPST associated with the TT.

At operation 410, an indication of a device type (DT) is received. The DT is a data structure of a category or set of devices representing one or more technical capabilities (e.g., functionality to measure a pressure, a torque, a speed, an altitude, etc.) of real world devices. Operation 415 involves assigning the at least one associated property of the TT to at least one of the capabilities of the DT of operation 410. Operation 415 thus includes defining the association or mapping between the selected TT and DT.

Operation 420 includes saving a record of the TT to DT assignment to a memory. In some instances, the memory is a persistent memory. In some embodiments, the memory is a main memory of an instance of an in-memory database.

Process 400 may be logically extended to encompass and cover other scenarios in addition to the specific examples discussed above. Regarding process 400, the process to create mappings may be extended to: create a new TT to DT mapping by creating a new DT for an existing TT; change or edit an existing mapping on a TT level where the relevant TT to DT combination remains valid by changing the associated mapping rules of the TT to DT combination; change mapping rules between a device and a thing on the device side by selecting an existing relevant device to thing mapping and changing its associated mapping rules; and replace a device with a new device by executing a thing onboarding with a different (existing) DT to TT combination for the new physical device and deleting the previous (old) mapping assignment related to the now replaced device.

Figure 5:
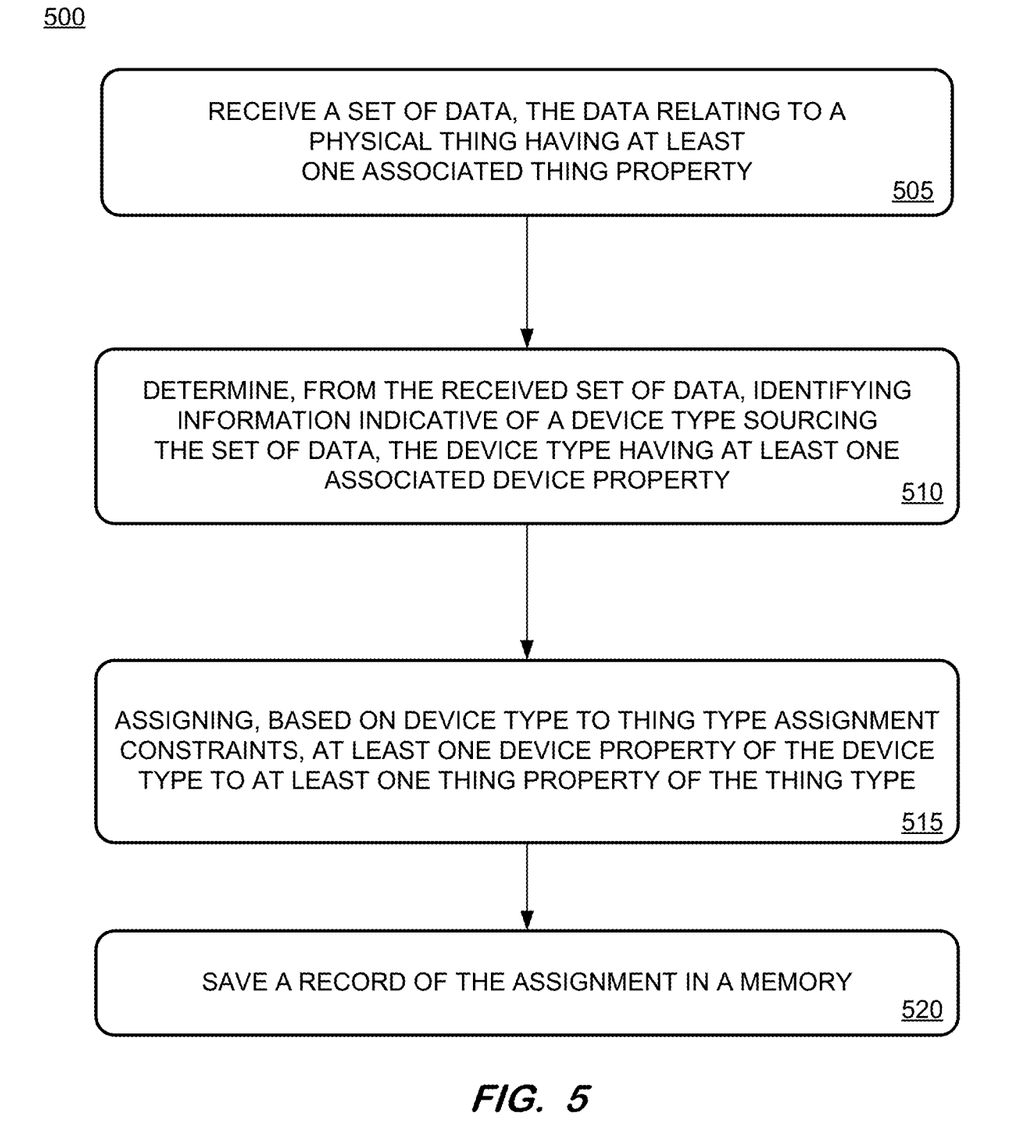
FIG. 5 is an example flow diagram of a process herein.

FIG. 5 relates to a process 500 to use a mapping on a type level, in accordance with an example embodiment herein. Process 500 might be invoked in response to a thing engineer's desire to ingest data automatically in an IoT context. At operation 505, a set of data is received. The set of data received at operation 505 may relate to a real world entity (i.e., physical thing) having at least one associated thing property. In some embodiments, the set of data may be extracted from a streaming pipeline of data.

At operation 510, a determination is made, based on the received set of data, regarding identifying information of a device type supplying or sourcing the set of data. Additionally, the device type has at least one associated device property.

In response to operation 510, an assignment is made at operation 515. In particular, at least one device property of the device type is assigned, based on some device type to thing type assignment constraints (e.g., device type to thing type mapping rules, etc.), to at last one thing property of the thing type.

Operation 520 includes saving a record of assignment of operation 520 to a memory. In some instances, the memory might be a persistent memory. In some embodiments, the memory is a main memory of an instance of an in-memory database.

Processes herein may be logically extended to encompass and cover other scenarios in addition to the specific examples discussed above. For example, existing mapping rules related to a thing type (TT) level may be deleted in response to them no longer being relevant. In one scenario, an existing TT to DT combination with existing mapping rules can be selected from a repository or memory and all of the mapping rules associating the DT with the given TT may be deleted. Furthermore, database entries related to the now deleted DT to TT mappings may also be deleted. Another example includes a scenario where a thing type (TT) definition might be extended to account for a new set of device measures (e.g., a device definition includes measure not previously reflected on the thing side). In this scenario, an existing DT to TT combination including associated mapping rules may be selected and measuring points not reflected by any properties on the TT side may be determined to trigger a new generation of a set of properties on the thing side. The new set of properties can then be assigned to the TT and mapping rules can be generated that capture the new measuring points and the properties of the thing as represented by the new set of properties. The thus created TT to DT mapping may be saved for future use and data ingestion.

Figure 6:
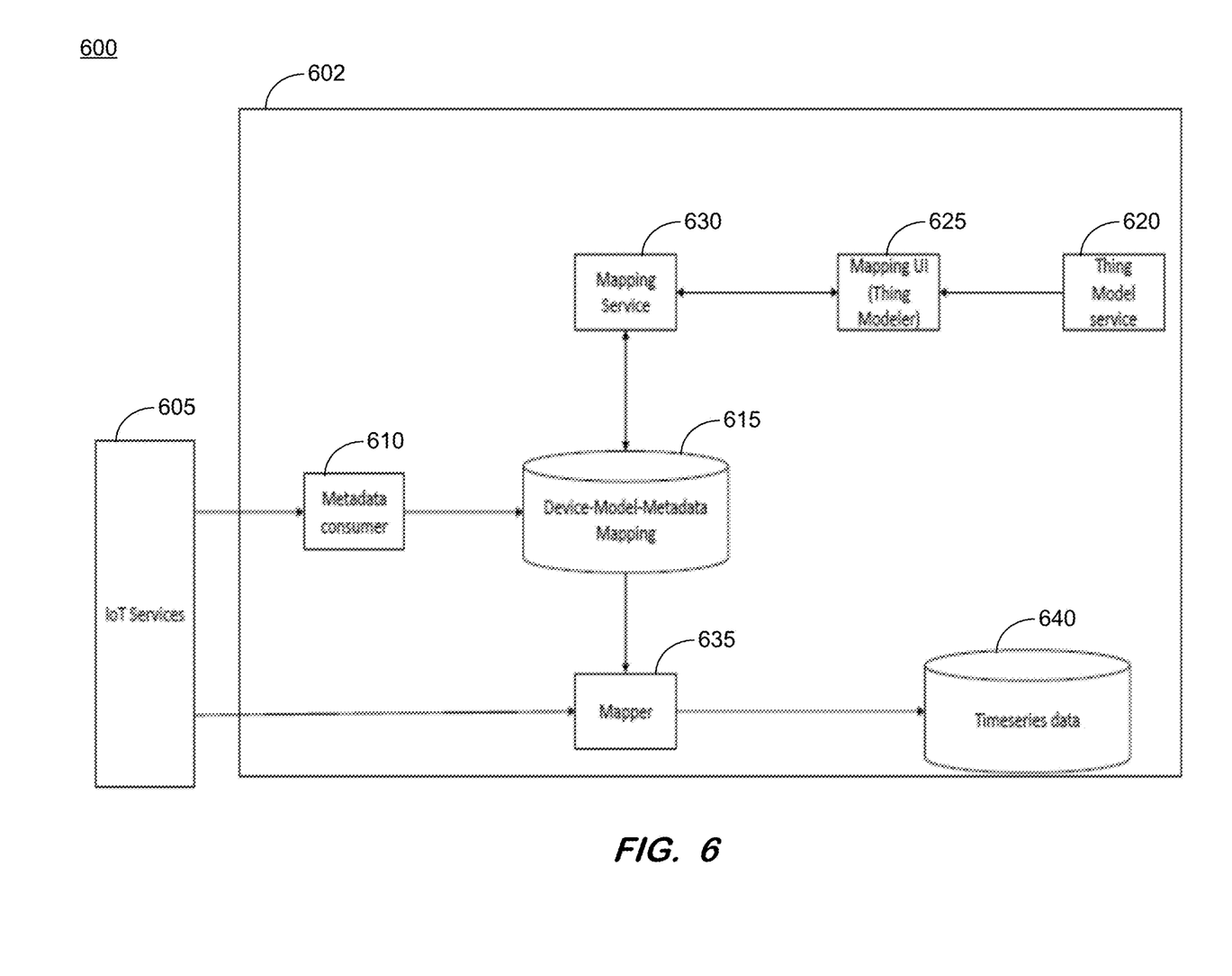
FIG. 6 is an illustrative depiction of an architecture overview herein.

FIG. 6 is an illustrative block diagram of a system architecture 600 that may be applicable to some embodiments herein. Examples of some embodiments of the present disclosure are not limited to the particular architecture 600 shown in FIG. 6. System 600 includes an Internet of Things (IoT) services gateway 605 that provides an interface or access to the world or realm of devices that might interact and interface with virtual representations or models of physical things and supply data related to those physical things. In some aspects and embodiments, IoT services gateway 605 provides an interface to some model aspects herein. For example, IoT services gateway 605 may provide access to virtual representations of devices (i.e., device models; not shown in FIG. 6). In some embodiments, when a device model is created, updated, or deleted IoT services gateway 605 sends metadata of the created/changed/updated device model to an IoT (cloud) platform 602. The metadata related to a device model may indicate the type of each device model and its capabilities. The metadata may, be received by metadata consumer 610. Metadata consumer 610 (e.g., an application, service, etc.) may further operate to save the metadata associated with the device model to database 615. The device model metadata might describe attributes, functions, and/or descriptions of the physical devices represented by the device model. Thing model service 620 (e.g., a backend service or system) may operate define, generate, or provide access to virtual representations (i.e., thing models) of real world things. In some embodiments, a thing model provided by thing model service 620 can be expressed, at least in part, in the form of metadata. A mapping user interface (UI) 625 may provide a mechanism for a user (e.g., a "thing engineer" or other entity) to interact with platform 602, including services and applications thereof, to specify aspects to define a mapping between a device model and a thing model. The defined device model to thing model mapping can be generated by mapping service 630 and persisted in database 615.

In some embodiments, one or more application programming interfaces (APIs) might be developed and deployed so that applications might communicate and interact with platform 602, without a need for mapping UI 625.

Still referring to FIG. 6, raw data, including but not limited to measurements from physical devices (not shown), can be sent from IoT Services gateway 605 to mapper 635 of platform 602. Mapper 635 may operate to perform a mapping operation or function as prescribed in device model to thing model definitions/rules stored in database 615. Mapper 635 might request (i.e., query) mapping information from database 615 and use the mapping information returned from database 615 (i.e., query response) and the raw data associated with the subject device model to generate time series data that can be stored in a data store such as, for example; memory 640.

During a runtime, the devices' raw data received from IoT services gateway 605 may be used by mapper 640 to execute the mappings and their associated mapping rules defined, generated, and stored in database 615 to generate time series data output that may be provided to a data processing interface 640. The architecture depicted in FIG. 6 may be implemented using various technologies, protocols, operating systems, and database systems, without being limited by the specific examples disclosed herein.

Figure 7:
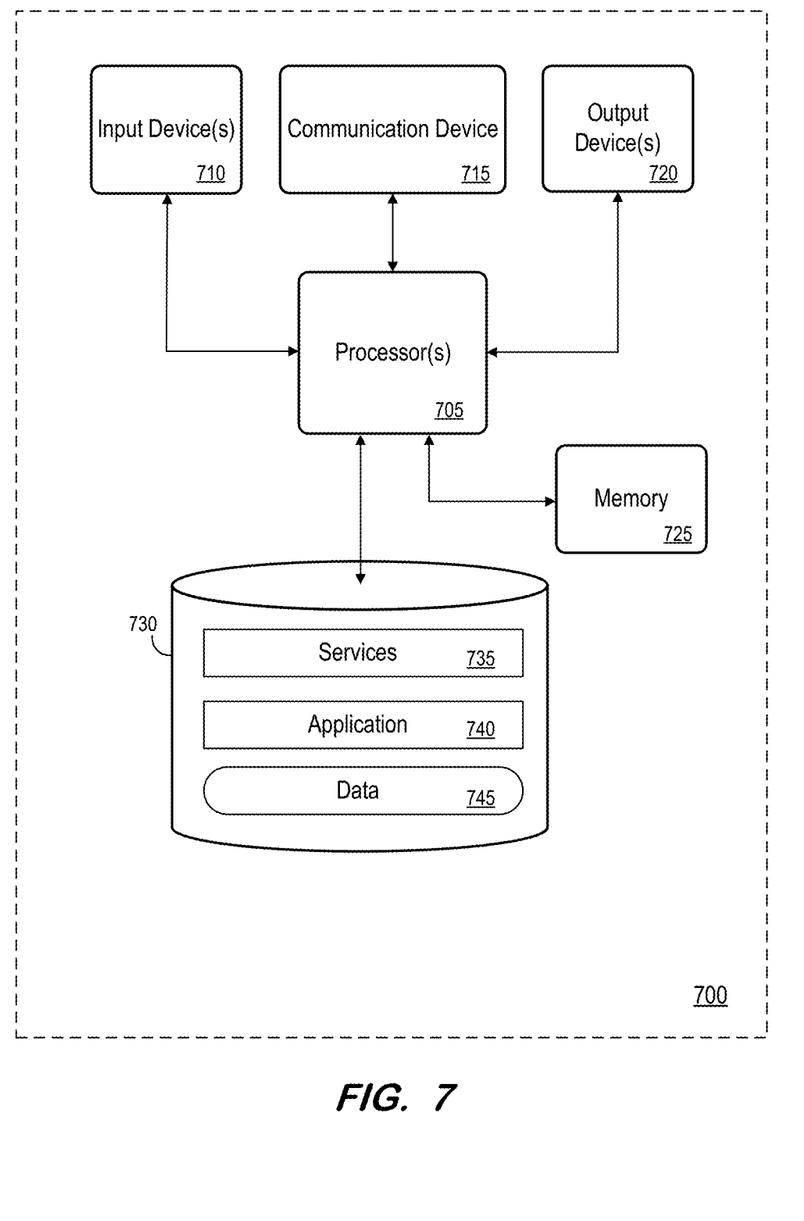
FIG. 7 is an illustrative depiction of an architecture including example embodiment details.

FIG. 7 illustrates an exemplary system diagram for performing the processed described herein. Apparatus 700 includes processor 705 operatively coupled to communication device 720, data storage device 730, one or more input devices 710, one or more output devices 720 and memory 725. Communication device 715 may facilitate communication with external devices, such as a reporting client, or a data storage device. Input device(s) 710 may comprise, for example, a keyboard, a keypad, a mouse or other pointing device, a microphone, knob or a switch, an infra-red (IR) port, a docking station, and/or a touch screen. Input device(s) 710 may be used, for example, to enter information into apparatus 700. Output device(s) 720 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 725 may comprise Random Access Memory (RAM), Storage Class Memory (SCM) or any other fast-access memory.

Services 735 and application 740 may comprise program code executed by processor 705 to cause apparatus 700 to perform any one or more of the processes described herein (e.g., 300, 400, and 500). Embodiments are not limited to execution of these processes by a single apparatus.

Data 745 (either cached or a full database) may be stored in volatile memory such as memory 725. Data storage device 730 may also store data and other program code and instructions for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions to cause the system to:
obtain a device model, the device model being a virtual representation of a physical device having at least one sensor of at least one capability, expressed at least in part as metadata and the device model to act as a source of data including at least one of a measurement, an observation, and technical information related to a physical thing having at least one associated property;
obtain a thing model, the thing model being a virtual representation of the physical thing having at least one associated property that accurately represents the physical thing and expressed at least in part as metadata, the device model and the thing model being separate and independent of each other and the physical device and the physical thing being independent of each other;
assign, during a design time, at least one capability of the at least one sensor of the device model virtual representation of the physical device to at least one associated property of the thing model virtual representation of the physical thing to define a relationship between the at least one capability of the of the device model and the at least one associated property of the thing model; and
save a record of the assignment of the at least one capability of the at least one sensor of the device model to the at least one associated property of the thing model in a memory.

2. The system of claim 1, wherein the representation of the device is provided by a service.

3. The system of claim 1, wherein the processor is further enabled to execute processor-executable instructions to cause the system to:
associate the saved assignment with a device type to thing type assignment, the device type representing a category of devices having a set of similar capabilities and the thing type representing a category of real world entities having similar associated properties.

4. The system of claim 3, further comprising generating the device type to thing type assignment.

5. The system of claim 3, wherein the device type to thing type assignment is retrieved from a memory.

6. A system comprising:
a memory storing processor-executable instructions; and
a processor to execute the processor-executable instructions to cause the system to:
receive an indication of a thing type, the thing type being a data structure of a category of physical things accurately representing physical entities having at least one associated property;
receive an indication of a device type, the device type being a data structure of a category of devices representing one or more technical capabilities of physical devices and a source of data including at least one of a measurement, an observation, and technical information related to the physical thing, the device type and the thing type being separate and independent of each other and the physical device and the physical thing being independent of each other;
assign, during a design time, the at least one associated property of the thing type to at least one of the capabilities of the device type to define a relationship between the one or more capabilities of the device type and the at least one associated property of the thing type; and
save a record of the assignment of the at least one associated property of the thing type to the at least one of the capabilities of the device type in a memory.

7. The system of claim 6, wherein the at least one associated property of the thing type is one of a set of properties associated with the thing type.

8. The system of claim 6, wherein the device type represents one or more sensors having a set of similar capabilities.

9. The system of claim 8, wherein the processor is further enabled to execute processor-executable instructions to cause the system to:
assign each of the properties in the set of properties associated with the thing type to at least one of the capabilities of the device type; and
save a record of the assignment of each of the properties in the set of properties associated with the thing type to at least one of the capabilities of the device type in a memory.

10. The system of claim 6, wherein the thing type represents one or more things having a set of similar properties.

11. A system comprising:
a memory storing processor-executable instructions; and
a processor to execute the processor-executable instructions to cause the system to:
receive a set of data, the data relating to a physical thing having at least one associated thing property and accurately represents the physical thing;
determine, from the received set of data, identifying information indicative of a device type sourcing the received set of data, the device type having at least one associated property of a physical device;
determine, based on device type to thing type assignment constraints, a relationship between the physical thing related to the set of data and the physical device identified as sourcing the set of data, the physical thing and the physical device being independent of each other and the device type and the thing type being separate and distinct from each other;
assign, during a design time and based on device type to thing type assignment constraints, at least one device property of the device type to at least at least one property of the thing type; and
save a record of the assignment in a memory.

12. The system of claim 11, wherein the thing type represents a category of physical entities having at least one similar associated property and the device type represents a category of sensors having one or more similar technical capabilities.

13. The system of claim 11, wherein the set of data is received from a streaming pipeline of data.

14. The system of claim 11, wherein the processor is further enabled to execute processor-executable instructions to cause the system to:
determine, from the set of received data, identifying information indicative of at least one of an identity the physical thing related to the set of data and a thing type of the thing related to the set of data.

15. A non-transitory computer-readable medium storing program instructions executable by a processor of a computing system, the medium comprising:
instructions to obtain a device model, the device model being a virtual representation of a physical device having at least one sensor of at least one capability and the device model to act as a source of data including at least one of a measurement, an observation, and technical information related to a physical thing having at least one associated property;
instructions to obtain a thing model, the thing model being a virtual representation of the physical thing having at least one associated property that accurately represents the physical thing, the device model and the thing model being separate and independent of each other and the physical device and the physical thing being independent of each other;
instructions to assign, during a design time, at least one capability of the at least one sensor of the device model virtual representation of the physical device to at least one associated property of the thing model virtual representation of the physical thing to define a relationship between the at least one capability of the of the device model and the at least one associated property of the thing model; and
instructions to save a record of the assignment of the at least one capability of the at least one sensor of the device model to the at least one associated property of the thing model in a memory.

16. The medium of claim 15, wherein the representation of the device is provided by a service.

17. The medium of claim 15, further comprising instructions to associate the saved assignment with a device type to thing type assignment, the device type representing a category of devices having a set of similar capabilities and the thing type representing a category of real world entities having similar associated properties.

18. A non-transitory computer-readable medium storing program instructions executable by a processor of a computing system, the medium comprising:
instructions to receive a set of data, the data relating to a physical thing having at least one associated thing property and accurately represents the physical thing;
instructions to determine, from the received set of data, identifying information indicative of a device type sourcing the received set of data, the device type having at least one associated property of a physical device;

instructions to determine, based on device type to thing type assignment constraints, a relationship between the physical thing related to the set of data and the physical device identified as sourcing the set of data, the physical thing and the physical device being independent of each other and the device type and the thing type being separate and distinct from each other;

instructions to assign, during a design time and based on device type to thing type assignment constraints, at least one device property of the device type to at least at least one thing property of the thing type; and instructions to save a record of the assignment in a memory.

19. The medium of claim 18, wherein the thing type represents a category of physical entities having at least one similar associated property and the device type represents a category of sensors having one or more similar technical capabilities.

20. The medium of claim 18, further comprising instructions to determine, from the set of received data, identifying information indicative of at least one of an identity the physical thing related to the set of data and a thing type of the thing related to the set of data.

* * * * *